Oct. 5, 1971 R. C. McMASTER ET AL 3,609,851
METAL WORKING APPARATUS AND PROCESS
Filed Oct. 19, 1967 3 Sheets-Sheet 1

INVENTORS
ROBERT C. McMASTER
CHARLES C. LIBBY
HILDEGARD M. MINCHENKO
FRED A. DeSAW

BY Anthony D. Cennamo
ATTORNEY

INVENTORS
ROBERT C. McMASTER
CHARLES C. LIBBY
HILDEGARD M. MINCHENKO
FRED A. DeSAW

BY Anthony V. Cummano
ATTORNEY

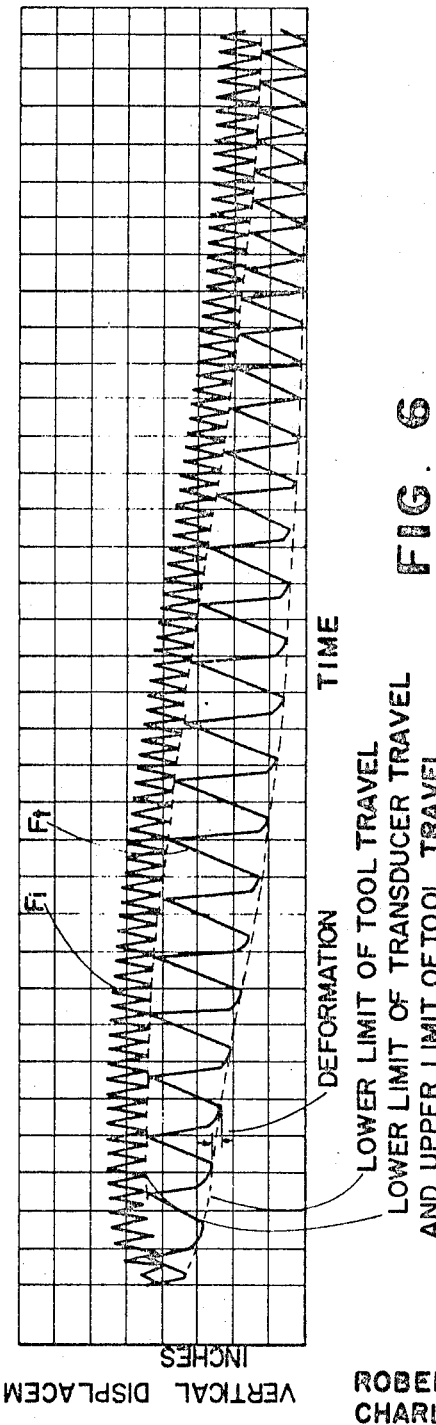

3,609,851
Patented Oct. 5, 1971

3,609,851
METAL WORKING APPARATUS AND PROCESS
Robert C. McMaster and Charles C. Libby, Columbus, Hildegard M. Minchenko, Reynoldsburg, and Fred A. De Saw, Columbus, Ohio, assignors to The Ohio State University, Columbus, Ohio
Filed Oct. 19, 1967, Ser. No. 676,550
Int. Cl. B23p 11/00; B21d 26/02
U.S. Cl. 29—243.54
8 Claims

ABSTRACT OF THE DISCLOSURE

This invention relates generally to the application of electromechanical transducer energy to a workpiece, and particularly to the utilization of a high Q electromechanical transducer capable of delivering extremely high-power outputs to a work surface for the deformation of metallic or non-metallic materials, such as, in riveting, cold heading, bonding, and swaging.

BACKGROUND

An electromechanical transducer such as a piezoelectric device is capable of transforming high frequency electrical impulses into high frequency mechanical impulses or vice versa. With an alternating-polarity input-voltage imposed on the piezoelectric elements, the transducer generates, transmits and amplifies a series of mechanical compression waves in the piezoelectric material and its metal supporting structure respectively. Considering the transducer alone, a succession of identical compression and tension waves transmitted in a transducer of proper length, produces a standing wave pattern.

In a straight bar the standing wave maxima and minima locations correspond respectively to locations of maximum and minimum velocity, minimum and maximum stress, and maximum and minimum displacement on the transducer body. These locations determine optimum positions for points-of-support, "steps" or changes in diameter, tools or mechanical couplers, etc. The node locations on the transducer correspond to locations of minimum axial displacement and velocity, the anti-node locations correspond to locations of maximum axial displacement and velocity or motion. The distance measured on the transducer between adjacent anti-nodes is equal to one-half wavelength at the fundamental resonance frequency, the length being dependent and variable with the shape.

There is disclosed in the copending application filed by Robert C. McMaster and Berndt B. Dettloff on Nov. 19, 1965, S.N. 508,812, now Pat. No. 3,368,085 for "Transducer," and assigned to The Ohio State University, a sonic transducer that combines the driving element (piezoelectric) with the mechanical displacement amplifier (horn) in a novel way. It is, in essence, a resonant horn structure excited internally close to the vibrational node. The excitation is in contrast to the external excitation common when horns are utilized in a sonic transducer system. The transducer therein disclosed is a high Q transducer, exceptionally rugged, compact, and capable of carrying continuous work loads.

There is disclosed in another copending application, also filed on Nov. 19, 1965, S.N. 508,774, now Pat. No. 3,368,086 for "Sonic Transducer" in the name of Charles C. Libby, and assigned to the same assignee as the above-mentioned application and the instant application, utilizing the principles of the transducer in the aforementioned copending application. The over-all structure is improved and operable in a manner to demonstrate commercial feasibility. Some of the features of that transducer include a means of positioning or applying external force through a holding fixture supported near the node of the transducer. The clamping arrangement providing internal static stress or mechanical-bias is acoustically an integral part of the horn. The output end of the transducer is threaded for coupling an attachment to the tool. Other features are disclosed.

The use of sonic energy has been suggested extensively in all fields of endeavor. Although the use of sonic energy has been at an increasing pace, realistically its use has been limited by one primary factor, i.e., lack of sufficient power. The prior art, in referring to high-power transducers, refers to transducers "up to 10 watts." There is disclosed in the copending application filed on Aug. 10, 1966, S.N. 571,490, now Patent Number 3,396,285 by Hildegard M. Minchenko for "Electromechanical Transducer," assignee, The Ohio State University, a transducer capable of delivering extremely high power, i.e., measurable in horsepower (or kilowatts) at an acoustical frequency range. The principle underlying the high-power output is in the structural arrangement of the components immediately associated with the piezoelectric driving elements. In theory and practice, the piezoelectric elements are under radial and axial pressure. In this way the piezoelectric elements are relieved of tension in operation even under intense sonic action. Significantly, the structural design that permits the extraordinary power output from the driving elements, resides in the novel method of clamping the piezoelectric elements both radially and longitudinally (axially). In this way the acoustic stresses in the piezoelectric elements are always compressive, never tensile, even under maximum voltage excitation.

There is further disclosed in the copending application filed on Dec. 28, 1966, S.N. 605,284, now Pat. No. 3,475,628 by Robert C. McMaster, Charles C. Libby and Hildegard M. Minchenko for "Sonic Transducer Apparatus," and assigned to The Ohio State University, the means for efficiently coupling a high-power, high Q electromechanical transducer to drive a tool effectively, i.e., to drive the tool in a work environment. The significant feature of the invention is that the tool does not form a part of the resonant structure.

BRIEF DESCRIPTION OF THE INVENTION

The present invention utilizes the aforementioned high Q electromechanical transducer and the aforementioned electromechanical transducer apparatus in a work environment. Specifically, a method and means has been achieved for sonically driving a metallic element until it is deformed. In the deformation of the metallic element, dynamic forces are substituted for the static forces of a conventional process. That is, the metallic element is deformed by dynamic forces with only a minimum amount of static pressure. The method comprises, basically, the utilization of high-power electromechanical energy to "flow" the metallic element. The means of the invention comprises the apparatus in a system configuration including the aforementioned transducer and the aforementioned transducer apparatus, together with the support structure and other attendant necessary components.

The utility of the present invention principally resides in joining two metallic or non-metallic sheets with rivets; forming heads on the rivets; or alternatively the energy may be utilized to enlarge the body of the rivet to maintain a force-fit in a preformed hole. Further, the principle of the present invention are equally applicable to other metal forming processes such as "swaging," i.e., decreasing diameter or changing shape of the workpiece with the use of dies by series of hammer blows, or to "cold heading," i.e., the use of dies and force to cause material to shorten and increase in diameter to fit a die.

OBJECTS

It is accordingly a principal object of the present invention to provide method and means of utilizing high-power electromechanical energy in a metal forming work environment.

It is a further object of the present invention to provide method and means of utilizing high-power electromechanical energy to join or bind metallic or nonmetallic plates to one another with metal inserts or in other metal forming processes wherein the workpiece shape or size is altered.

It is another object of the present invention to provide method and means of utilizing high frequency electromechanical energy in a metal forming process to substitute dynamic forces for static forces.

Other objects and features of the present invention will become apparent from the following detailed description when taken in conjunction with the drawings in which:

THEORY OF OPERATION

Figure 2:
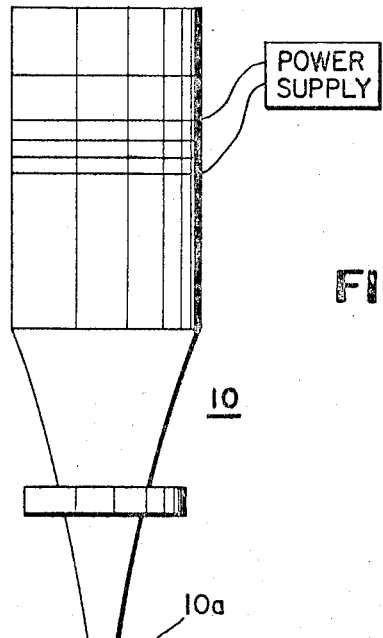
FIG. 2 is an over-all schematic illustration of the high-power electromechanical transducer in the work environment.

The transducer in operation drives an impact tool which impact tool, in turn, deforms or changes the shape of the metallic member in a useful way. In specific embodiments this may be riveting, i.e., the formation of a head on a metallic insert; swaging, i.e., decreasing the diameter or changing the shape of a workpiece, cold-heading, i.e., shortening or increasing the diameter of the workpiece; or other metallic deformation processes. In each process, through the utilization of the power-sonic energy, a dynamic force replaces the static force that is characteristic of the other forms of energy normally used in these metal working processes. More specifically, in the preferred embodiment of the present invention, the constant static force applied to the workpiece is drastically lessened or more specifically static force is not actually utilized in the metal working operation. The work effort in the deformation of the metallic member undergoing deformation is a dynamic force cyclically applied.

It is appreciated that ultrasonic energy has been utilized by the prior art in various metal working processes—for instance—in bonding. In the prior art bonding processes, the faying surfaces are rubbed together. Significantly, in this prior art process, there is little or no transfer of material from one surface to another. The bonding occurs only in those areas of intimate contact. In the present invention, through the utilization of power-ultrasonic energy, when welding occurs there is actually a transfer of material of one surface to another. The faying surfaces are moved relative to each other but in contradistinction to the prior art there is an intermingling of the material between the two surfaces. Again it is stated, the primary significant difference between the present invention and that of the prior art in accomplishing the intended result is the availability (through the aforementioned transducer) of substantially increased amounts of power at the horn surface.

The exact nature of the joining or bonding of the hard metals is not fully appreciated and presently cannot be properly categorized in terminology relative to what occurs. In other types of metals such as aluminum, the type of bond is similar in appearance at the interface to that of explosive bonding. Again from cross-sectional analysis of riveted structure it does appear in some cases as though there is a weld between the rivet and the two plates. It can be appreciated, of course, that through the utilization of a dynamic force on the workpiece and consequently with the reduction of static force by a factor of 100 or more, the size of the structure, i.e., the machinery performing the work, is drastically reduced in size and cost. As a further illustration, with a single stroke—static force—or the mechanically vibratory metal deformation processes the hard metals, such as titanium, do not lend themselves to metal deformation processes such as riveting. In the instant invention, the dynamic force applied to the workpiece from the ultrasonic transducer can be understood as causing incremental deformation of the workpiece. The process of the present invention has been successful in the deformaion of hard metals such as titanium without cracks in the junction and without creating a crystalline structure.

With reference to FIG. 6 it is seen that the frequency $f_t$ of the transducer motion and the frequency $f_i$ for the impact tool are not the same. Further, through the utilization of a resonant structure, the frequency $f_t$ of the transducer will be relatively constant, whereas the frequency of the impact tool, $f_i$, changes—increasing as the deformation decreases. Other factors to be taken in consideration in determining the frequency of the impact tool are the shape or dimensions of the dies, the work surface material, the static force applied, and the tool mass.

When operable in a metal deformation process the ultrasonic energy is applied to the workpiece or work surface by driving the rigid tool downward through impact with the transducer. The tool, in turn, impacts the metallic member to plastically deform the same in the desired manner. In theory—the frequency differential between the transducer and the tool permits energy to be stored in the transducer between strokes of the tool. It is the utilization of this stored energy that develops the work force applied to the workpiece.

Again, with reference to FIG. 6, it is seen that in addition to the differential between the impact tool and transducer frequency there is an amplitude differential. Due to the high efficiency of the energy conversion from transducer motion to work deformation, the products of frequency and amplitude are approximately the same for the transducer and the tool. Thus, for example, a 10,000 cycle per second motion of 0.003″ in a transducer may be converted to a 1000 cycle per second 0.03″ motion of the tool, or to a 3000 cycle per second 0.01″ motion of the tool depending on the factors described previously.

Spring back is a relatively constant force (for any given material) which accelerates the tool away from the deformed surface. The force is developed when the energy delivered to the work surface by the tool has been reduced sufficiently that the force required to continue plastic deformation can no longer be delivered by the tool. This occurs when the stored energy of tool velocity (kinetic energy) is dissipated.

It is to be noted that the initial impact of the tool with the work surface causes the greatest deformation and with each succeeding impact less deformation occurs. The time required for deformation is reduced accordingly and spring back occurs at a more rapid pace with each succeeding impact. Thus a higher frequency of impact will occur as the deformation per stroke is reduced.

Gravity is not utilized in this cyclic process, that is, none of the steps described are dependent on gravity.

In producing the high dynamic forces (Force=F) necessary to exceed the elastic-limit of the material used for the rivet, the riveting tool (Mass=M) is decelerated (Acceleration=A) during the time of contact of the tool with the rivet. The equation $F=MA$ describes these dynamic inter-relationships.

Since it is also true that for every action there is an equal and opposite reaction, the rivet is simultaneously accelerated away from the tool-rivet inter-face with a force (F) approximately equal to the force generated by the tool impact.

Figure 1:
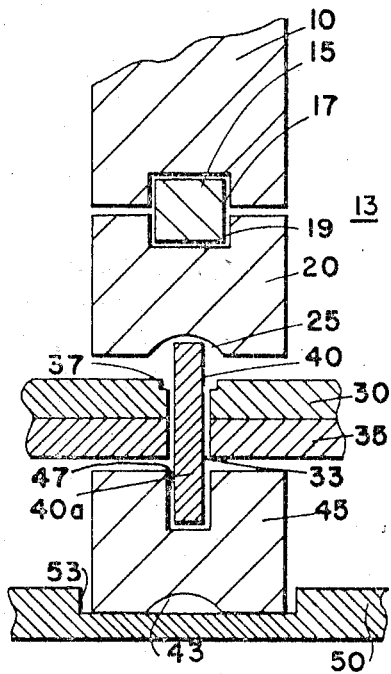
FIG. 1 is a cross-sectional view of the electromechanical transducer in the work environment.

In order to retain the rivet in location, or to minimize its total displacement away from the tool interface during impact, the inertia of the rivet system is increased by a "back-up tool" (in the embodiment of FIG. 1 holding device 45). This device, returned in position by a retaining or static force, is accelerated away from the rivet (rear side) by the force F, at the instant of impact and tool deceleration. The same equation that relates the tool mass and its deceleration, relates the back-up mass and its acceleration.

Actually the returning force slightly reduces the dynamic force available for acceleration of the back-up tool during the impact. However, since the dynamic force is high enough to elastically deform the rivet material, and the returning force is less than 400 pounds, the effect is minimal in the embodiment described.

DETAILED DESCRIPTION OF THE DRAWINGS

Referring now to FIG. 2 there is illustrated in an overall view a high-power, high-Q transducer such as that described in the aforementioned patent, No. 3,396,285. This transducer has fixedly positioned at its tip $10a$ one end of the transmission line 12 in longitudinal alignment. Also in longitudinal alignment with the other end of the transmission line 12 is the impact tool 20 and the workpieces 30 and 35.

Referring now specifically to FIG. 1, there is shown in cross-section an exploded view of that portion of 13 the electrical mechanical transducer utilized with the transducer apparatus, as shown in dotted line on FIG. 2, in the joining of two sheets of metal with a metal insert. Specifically, transducer 10 has coupled thereto an impact tool 20. As described in the aforementioned copending application (Ser. No. 605,284), now Pat. No. 3,475,628 the impact tool 20 is positioned in free motion with the transducer 10 by the positioning means 15. Positioning means receiving slot 17, formed in the underside of the tip of transducer 10 and receiving slot 19 formed in the upper end of the impact tool 20 retain the positioning means 15 in place. The impact tool 20 also has formed in the underside thereof a cup-shaped depression 25. The size and contour of this depression 25 may conform to that of a standard rivet head. Plates 30 and 35 are the work pieces which are intended to be joined together by the metallic insert 40—specifically a rivet. The plates 30 and 35 are fixedly positioned to permit the rivet 40 to be directly in line with the receiving aperture 33 formed therethrough to receive rivets. The upper portion of the aperture 33 is countersunk, as shown at 37, to receive the metal flow.

Immediately beneath the plates 30 and 35 is a back-up mass or source of static force 45. This device may be cylindrical in shape and is bored at 47 to receive the rivet extension $40a$. On the underside of source of static force 45 is a second cup-shaped depression 43. The base 50 having a recess therein at 53 adapted to receive the back-up mass 45 and to retain the same in lateral position. The static force is applied to by plate 50 to back-up mass 45.

In operation of the arrangement shown in FIG. 1, electromechanical energy is applied to the metal insert 40 by the downward force of the impact tool 20. The impact forces the metal insert 40 downward until its extreme end $40a$ abuts against the recess 47 in the back-up mass 45. With continued impact the metal rivet deforms until a rivet head is formed between the countersink 37 and the depression 25.

In the next step the plate assembly 30, 35, and 40 is reversed and the source of static force 45 is inverted in order that the cup-shaped depression 43 will receive the rivet head formed by cup-shaped depression 25. With impact again applied, the previously formed rivet head seats itself in the depression 43 and the metal rivet deforms on its opposite end until a second rivet head is formed by the depression 25.

Figure 3:
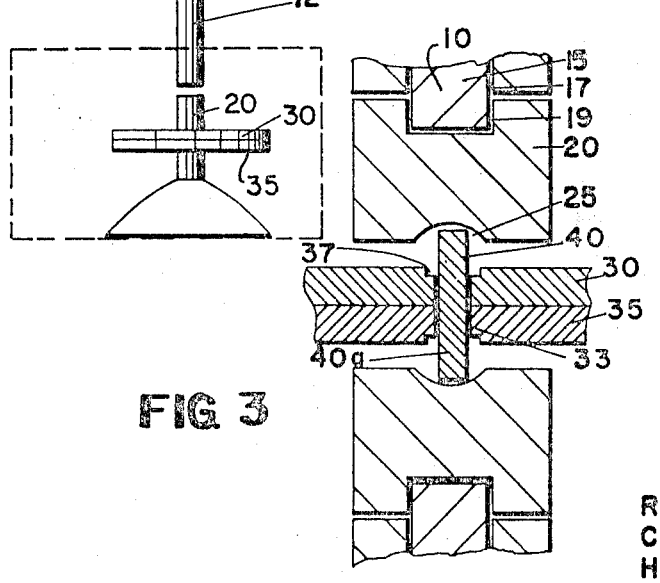
FIG. 3 is an alternative arrangement illustrating the use of oppositely positioned electromechanical transducers.

In an alternate arrangement a pair of transducers may be utilized in a manner as that shown in FIG. 3 to form a head at either end simultaneously from a straight shank rivet.

In other instances a preformed headed rivet may be utilized. With this arrangement, the source of static force 45 will have its depression 43 in the upper position to receive the head of the rivet and the second step above-described will be followed.

The straight shank rivets utilized had a length-diameter ratio of approximately 3 to 1.

Since alignment is important to the formation of a good rivet head, the impact tool 20 and source of static force 45, as shown in FIG. 1 in operation should be aligned properly; otherwise, the rivet will tip one way or the other and the head will be formed improperly.

Figure 4:
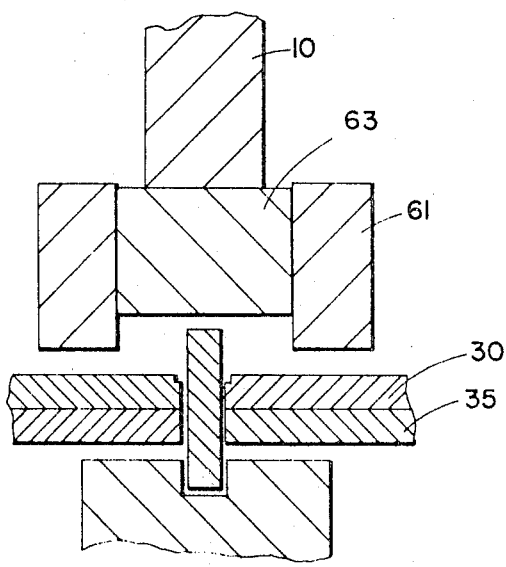
FIG. 4 and 4a are other alternative arrangements illustrating different tool apparatus for use in metal deformation.
Figure 4A:
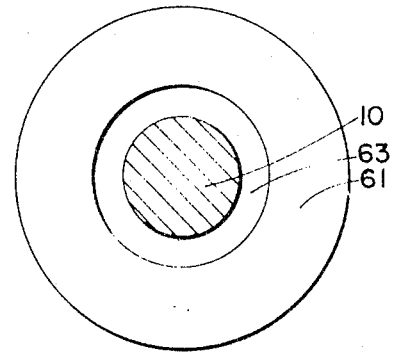

With reference to FIGS. 4 and $4a$ there is a first alternative arrangement of the work tool intended to accomplish the intended result of metallic deformation. In this embodiment the cup-shaped member 61 has its bottom area 63 as the driving member, i.e., the contact member between the tool and the deformable element.

Figure 5:
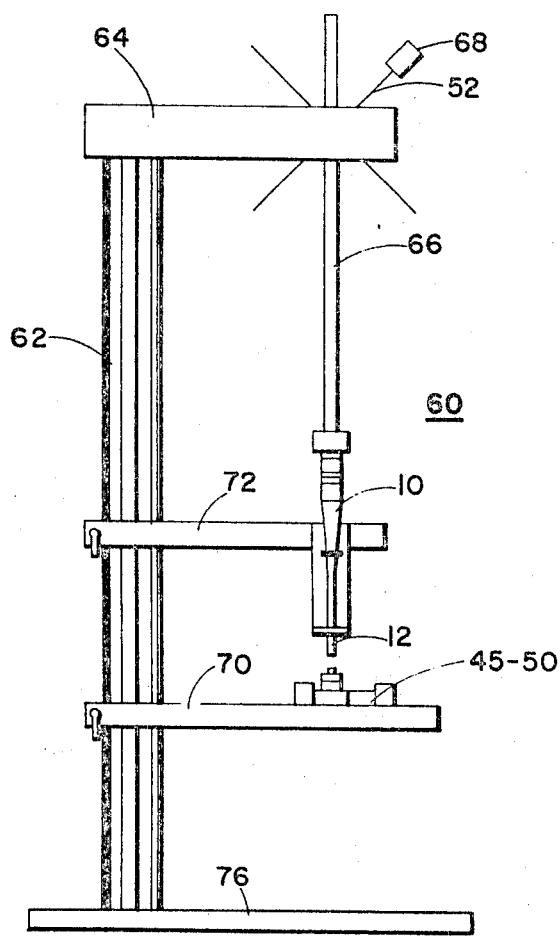
FIG. 5 is a schematic illustration of the complete system utilized in the bonding of two sheets of metal with metal inserts; and, FIG. 6 is a graphical illustration of the frequency curves of the transducer vs the impact frequency.

In order that the method may be carried out with repetitive accuracy, the system illustrated schematically in FIG. 5 was developed. As pointed out above, the preferred embodiment included the high-power, high Q transducer 10, such as that disclosed in the aforementioned copending applications.

Specifically, the system structure 60 comprises supporting post 62 having a large foot plate 76 for maintaining the over-all structure in a steady state. A first cross-supporting member 64 has the vertical rotating mechanism incorporated therein to effect vertical movement of the driving post 66. To maintain vertical alignment of the transducer 10 is a second horizontal cross-supporting member 72; and to assure that the transmission line is in vertical alignment with the transducer 10, there is further provided supporting structure 70. Positioned at the end of driving post 66 and in alignment with the member 72, is the transducer 10. It is, of course, understood that the coupling arrangement between the driving post 66 and transducer 10 can be varied. Positioned directly beneath the aperture in member 72 is the supporting structure 70. This structure 70 also has an aligned aperture formed in the base thereof. The base is supported by rigid engagement with the member 72. The aperture in the base of the structure 70 is adapted to receive and position the transmission line 12.

Directly beneath—and again in alignment—the transmission line 12 is the structure 45–50 identical to that shown in FIG. 1.

Attached to the one lever arm 52 is the weight 68 for applying pressure to the transduced downward movement by the driving post 66. Also for convenience and accuracy, a pressure gauge may be attached to the lever to record the downward force.

In a specific preferred embodiment there was utilized a 50–kw. motor generator operating at approximately 10,054 cycles per second. The transmission line 12 approximated 10.12 inches in length. The static forces applied to the impact tool and back-up mass are in the order of 450 pounds for rivets formed from straight shank rivets (3/16" aluminum) having average shear strength of 3,000 to 3,400 pounds.

The good smooth uncracked surfaces indicated the yield strength of aluminum was exceeded. If static force alone were responsible for metal deformation then about 50 times the static force utilized here was required. In other words, with the use of ultrasonic energy a high dynamic force was used with a corresponding reduction of the required static force. The total elapsed time to form the rivet was one second or less per side with manual operation.

In reviewing the chronology of the actions in a riveting sequence, let us examine one series of action which is repeated thousands of times during a typical one-second riveting action:

(1) The tool impacts the driving transducer, and the tool is accelerated by the impact in the direction of the rivet. It stores kinetic energy as it picks up velocity.

(2) The tool impacts the rivet-head and the tool mass M begins to decelerate, delivering kinetic energy to the tool-rivet interface.

(3) The force F generated by the tool deceleration A is equal and opposite to the force accelerating the rivet away from the tool-rivet interface during this impact.

(4) The produce of mass of the tool M and its deceleration A, is numerically equal to the product of the mass ($m$) of the rivet (plus the rest of the back-up mass system), and the acceleration ($a$) of that system during the time of rivet deformation, Thus $F=MA=ma$.

(5) The amplitude of the acceleration of the rivet away from the impact, is minimized by increasing the amplitude of the mass of the back-up mass system. This in turn reduces the total displacement of the rivet and the bending of the plate during rivet deformation.

(6) The external force (static force) retaining the back-up mass against the rear side of the plates, slightly reduces the dynamic force available for acceleration of the rivet-mass system. Numerically this is a minimum reduction since the retaining force is only a few hundred pounds for ⅜" rivets and the dynamic force is sufficient to plastically deform the rivet material.

(7) The back-up mass or back-up inertia finally moved free of the rear of the rivet-mass system, and is restrained in its flight by only the retaining force or static force. This force acts in such a direction as to return the back-up mass to its original position. The amplitude of the retaining force must be sufficient to return the back-up mass before the next successive stroke of the tool against the rivet.

(8) The deceleration of the tool (and its dissipation of stored kinetic energy) continues, as long as the rate at which the tool can deliver energy (or as long as the force developed by deceleration) is sufficient to maintain the rivet in plastic deformation.

(9) When the tool ceases to decelerate at sufficient rate to maintain the rivet material in a plastic state, the rivet material "freezes" or "springs-back" to its solid, non-plastic state.

(10) This spring-back action accelerates the tool in the direction of the tool transducer interface and away from the tool rivet interface. It also accelerates the rivet-back-up mass system away from the rivet interface, in an opposite direction, with an equal force. This spring-back force accelerating the rivet and back-up mass away from the rivet interface, is in the same direction, and is a continuation of, the force described in (3).

(11) The cycle is now completed, with all dynamic driving and working forces and static restraining forces having been described.

Although certain and specific embodiments have been illustrated, it is to be understood that modifications may be made without departing from the true spirit and scope of the invention.

What is claimed is:
1. A material deformation system comprising:
(a) transducer means for storage of energy and an electrical power supply system connected thereto;
(b) a tool having a given mass for extracting said stored energy at a time rate enormously greater than the time rate at which said energy is stored;
(c) said means for extracting energy accelerating said tool to a high velocity thereby converting said stored energy into motional energy, i.e., kinetic energy, of said tool mass;
(d) deformable metal surface positioned in the path of said tool motion thereby causing said tool to impact said metal surface;
(e) aligning means for aligning and maintaining in longitudinal position said transducer and said tool;
(f) said impact completely decelerating said tool motion, the work on said metal surface being equivalent to said kinetic energy which had been stored in said tool mass;
(g) a reaction mass located in free contact with the back side of said metal surface;
(h) and means for cyclically relocating and aligning said reaction mass;
(i) said cyclically relocating means comprising an externally produced source of static energy equal and opposite to that applied to said tool.

2. A system as set forth in claim 1 wherein said aligning means for relocating and aligning said reaction mass comprises an externally produced force, means to direct said force to retain in and return to position, said reaction mass, and
wherein the time available to return the reaction mass to position is equal to or less than the time between repetitions of the said cycle.

3. The system as described in claim 2 wherein said deformable metal surface comprises a structural metallic material having elastic properties under low dynamic force per unit area and being capable of permanent deformation under high dynamic forces, and
wherein said elastic properties develop a "spring back" force to return the tool to its normal position after it has decelerated.

4. The system as described in claim 1 wherein said means for storage of energy is high-Q sonic transducer.

5. The system as described in claim 1 wherein said means for storage of energy is a high-Q sonic transducer having an elongated configuration and the maximum amplitude of vibration is at the extreme end thereof, wherein said tool mass is accelerated by impact with extreme end.

6. A system as set forth in claim 1 in which the reaction mass is a low-inertia mass in a size range between that of said tool mass to many orders of magnitude thereof and sufficient to develop forces necessary for metal deformation;
wherein the effect of increased mass is to reduce the motion of the work on the metal surface and of its supporting structure.

7. A system as described in claim 2 in which the reaction mass is a low-inertia mass in a size range between that of said tool mass to many orders of magnitude thereof and sufficient to develop forces necessary for metal deformation;
wherein the effect of increased mass is to reduce the motion of the work on the metal surface and of its supporting structure.

8. The system as described in claim 2 wherein the said externally produced force is a static force of at least an order of magnitude less than the dynamic force necessary to cause metal deformation of the surface area.

References Cited
UNITED STATES PATENTS

| | | | |
|---|---|---|---|
| 3,201,967 | 8/1965 | Balamuth et al. | 72—431 |
| 3,224,086 | 12/1965 | Balamuth | 227—131 |
| 3,367,809 | 2/1968 | Soloff | 29—470 |
| 3,475,628 | 10/1969 | McMaster | 310—8.2 |

ANDREW R. JUHASZ, Primary Examiner

L. GILDEN, Assistant Examiner

U.S. Cl. X.R.

72—56; 228—1